United States Patent
Polanyi et al.

[11] 3,910,276
[45] Oct. 7, 1975

[54] MICRO-SURGICAL LASER SYSTEM

[75] Inventors: Thomas G. Polanyi, Bolton; Jan Pejchar, Maynard; Robert A. Wallace, Wayland, all of Mass.

[73] Assignee: American Optical Corporation, Southbridge, Mass.

[22] Filed: May 23, 1974

[21] Appl. No.: 472,779

[52] U.S. Cl. ............................ 128/303.1; 128/395
[51] Int. Cl.² ........................................ A61N 3/00
[58] Field of Search ............... 128/303.1, 395, 6–9; 331/94.5

[56] References Cited
UNITED STATES PATENTS 3,348,547   10/1967   Kavanagh ........................... 128/395
3,659,613   5/1972    Bredemeier ......................... 128/395
3,821,510   6/1974    Muncheryan ..................... 128/303.1

*Primary Examiner*—Lawrence W. Trapp
*Attorney, Agent, or Firm*—Joel Wall; William C. Nealon; H. R. Berkenstock, Jr.

[57] ABSTRACT

A micro-surgical laser system wherein a carbon dioxide ($CO_2$) laser is fixedly attached to the freely positionable combination of an operation or surgical microscope and a stereo laser endoscope. This arrangement completely eliminates the need for a bulky and/or complex laser-beam-guiding articulated arm apparatus. The laser features novel and light-weight construction, and novel means for heat exchanging.

16 Claims, 2 Drawing Figures

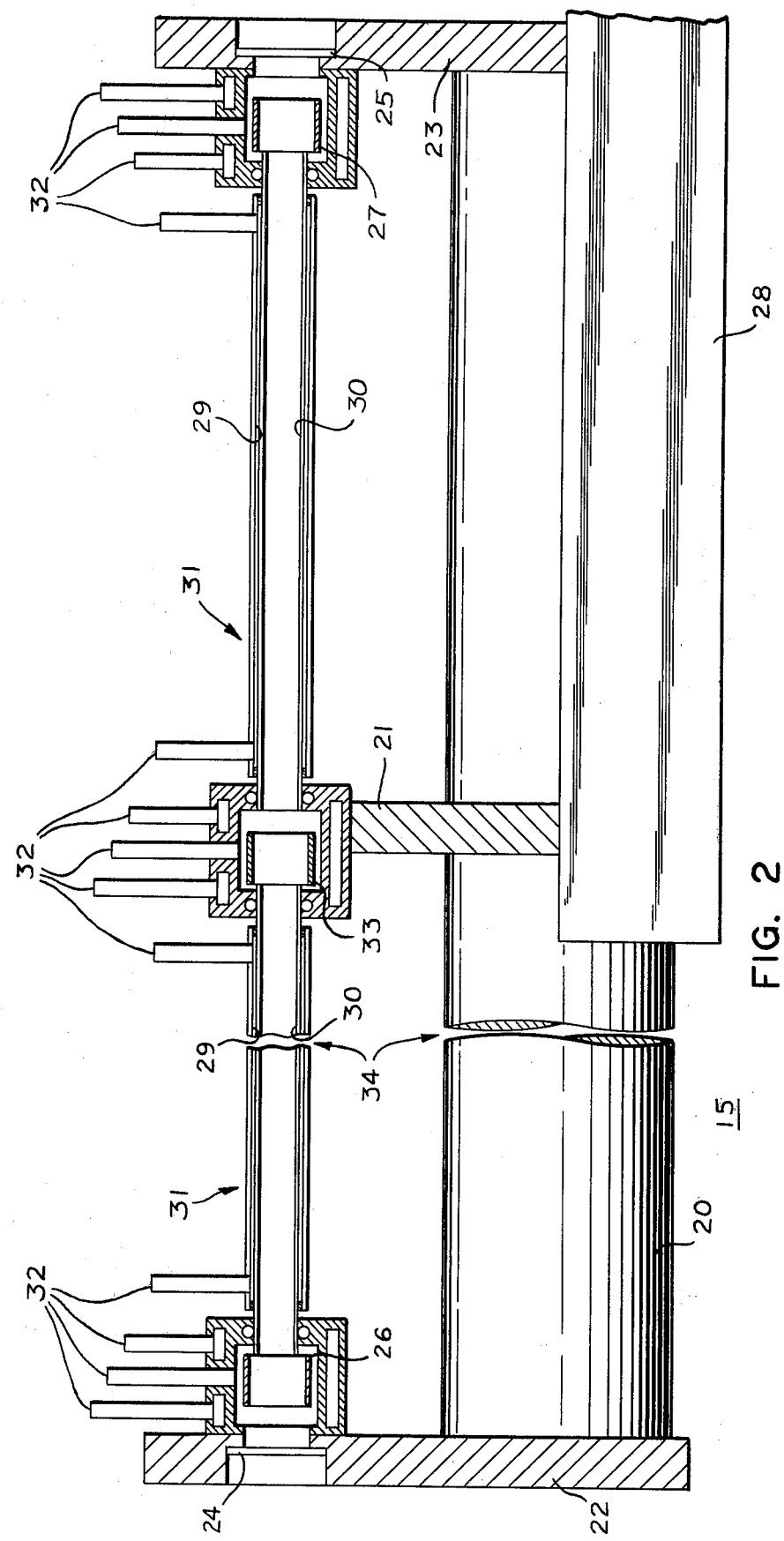

MICRO-SURGICAL LASER SYSTEM

BACKGROUND OF THE INVENTION

1. Field of the Invention

The present invention relates generally to a micro-surgical laser system and more particularly to a system wherein a $CO_2$ laser is fixedly mounted with respect to freely-positionable surgical microscope means.

2. Description of Prior Art

Prior art methods of performing surgical operations involved insertion of surgical instruments for cutting, electrical cauterization, burning, freezing, or otherwise destroying tissue by physical contact. Some of these older methods caused undesirable bleeding and/or poor control of damage.

By employing the $CO_2$ laser beam for surgery, one takes advantage of an ability to direct and control application of relatively large dosages of infra-red energy to sharply delineated sites. Sharply focused laser beams have been used clinically, for example, for treatment of the eye by photo-coagulation. As a precise cutting tool, the laser is finding many new clinical uses and applications in the field of medical research. Because laser light can be sharply focused, the laser beam is capable of performing surgery at microscopic dimensions in such areas, such as the inner ear. There is, therefore, a growing demand for laser equipment with which the surgeon can safely and efficiently utilize the laser.

Typical advantages in using carbon dioxide or other far infra-red energy lasers for a number of surgical interventions are lack of bleeding, accurate control of tissue removal and improved healing. A $CO_2$ laser, in addition to providing high power output, also has the advantage of having substantially all of its 10.6 micron radiation absorbed by body tissues; a condition not obtained when laser energy from other sources such as ruby, for example, at 6,943 millimicrons is employed. Further information on the advantages of this type of surgery, particularly for relatively inaccessible body locations such as the larynx and the bronchi, are presented in the publication "Laser Surgery in the Aerodigestive Tract," by M. Stuart Strong, M.D., Geza J. Jako, M.D., Thomas Polanyi, Ph.D., and Robert A. Wallace, B.S.E.E., The Americal Journal of Surgery, 126:529–533, October 1973.

But, in former laser instrumentation, many problems have been encountered in attempting to meet the surgeon's need for obtaining a precise location and maintaining control of the focused laser beam. The focused spot size has a diameter on the order of 1 millimeter. The work site, particularly if small and remotely located (e.g. vocal cords), is best viewed with a microscope to correctly position the spot and follow the process of the surgery. In micro-surgical practice the site to be operated on is visualized by careful and delicate positioning of the microscope. Such a site might be inside the ear, in which case the microscope is aimed through a speculum or on the vocal cords in which case the microscope is aimed through a laryngoscope; other operating sites are similarly visualized through specialized tools. After the site is properly visualized such surgical modalities as cauterizing probes, scissors, cryogenic probes, etc. are conventionally used to excise or remove pathological tissues. Frequent repositioning of the microscope is generally required. The side can be viewed directly through the surgical microscope in connection with a stereo laser endoscope, such as that described in U.S. Pat. No. 3,796,220 which issued on Mar. 12, 1974, which is assigned to the assignee of the present invention, and which patent is incorporated herein by reference.

The device of U.S. Pat. No. 3,796,220 joins the laser to the operation microscope in such a way as to provide an aiming light visible to the surgeon and capable of being positioned anywhere in the visual field of the microscope. After the surgeon has positioned the aiming light in the tissue he wishes to operate on, a foot operated switch permits him to deliver a focused beam dosage to the selected area.

However, even with this improved stereo laser endoscope device, delivering the laser beam from a laser designed to be stationarily mounted to the operation microscope-endoscope combination remained a problem since it required the use of a complex articulated arm. An articulated arm uses successively reflecting mirrors, perhaps as many as seven or more, arranged so that a light beam reflected from the last mirror and focused by appropriate lenses can be pointed in some desired direction. The articulated arm, to be further described below, channels the beam from output of the laser to input of the microscope/endoscope apparatus.

Although an articulated arm does permit considerable freedom of movement for a laser beam exiting control, the length of the articulated arm is fixed and certain movements desirable to an operating surgeon may not be available which presents a problem. Other disadvantages of the articulated arm include the relatively large number of mirrors required which presents compounded alignment problems as well as loss of energy of the laser beam at each successive reflection. Furthermore, the arm structure itself may impose a constraint of curvi-linear motion of the beam exit aperture at a certain arm position; this may prevent perpendicular penetration of the beam into a surface for finite side-ways displacements of the beam. Moreover, the articulated arm is necessarily large and requires complex supporting structure with careful counterbalancing in order for it to work properly. Since an articulated arm is old in the art, it is not necessary to describe in detail the operation and construction of the arm in order to understand the present invention. The present invention eliminates the necessity of the articulated arm and thus solves these problems associated with the prior art.

SUMMARY OF THE INVENTION

The present invention relates to a surgical laser system which includes a surgical microscope in operative rigid connection with a stereo laser endoscope, the microscope/endoscope assembly being freely positionable, and a $CO_2$ laser device fixedly mounted with respect to the assembly and capable of operating under virtually any angular orientation of the microscope/endoscope assembly which may be necessary to accomodate a surgeon or other person who may be operating the system and performing surgery upon a patient.

The present invention also relates to positioning the laser in a fixed relationship with respect to the input of the stereo laser endoscope which in turn is located in a fixed position with respect to the operation microscope, and to position such laser so as not to interfere with any of the principal conventional modes of use of the operating microscope.

A further feature of the present invention includes the mounting of the surgical microscope, endoscope, and laser device on an extendable arm fastened to a sleeve, the sleeve being vertically positionable on a horizontally mobile upright support.

It is yet a further feature of the present invention to provide novel heat exchanger means to maintain the $CO_2$ laser operating at a relatively constant temperature above room temperature.

The advantages attendant to the use of the present invention include superior ease of handling of the system by the surgeon because of the elimination of the complex articulated arm apparatus of the prior art, and increased operating efficiency due to reduction of energy loss otherwise due to the necessarily many reflections in the articulated arm.

It is thus an object of the present invention to provide an improved micro-surgical laser system.

It is another object of the present invention to provide a surgical laser system wherein the laser employed is fixedly mounted with respect to a freely positionable optical system utilized by the surgeon to view and control the surgery for which he is responsible.

It is yet another object of the present invention to provide a surgical laser system which eliminates the need for articulated arm apparatus.

A further objective of the invention is to attach the laser to the stereo laser endoscope as a unit and have this unit removable in one block from the operation microscope, thus restoring the microscope to its conventional use.

A further objective of the invention is to minimize both the bulk and the weight of the laser which is attached to the operating microscope.

An additional objective of the invention is to operatively disconnect by means of a movable mirror the laser from the stereo laser endoscope thus making the beam available for introduction into an articulated arm of special construction which is connected to an accessory which permits surgeons to use the laser beam to operate endoscopically e.g. in the bronchi, the ear, the rectum, etc.

Other objects and advantages of the present invention will become apparent to one of ordinary skill in the art after referring to a detailed description of the appended drawings wherein:

BRIEF DESCRIPTION OF THE DRAWINGS

FIG. 2 is a schematic diagram of the laser employed in the illustrative embodiment of FIG. 1.

DESCRIPTION OF THE PREFERRED EMBODIMENT

Figure 1:
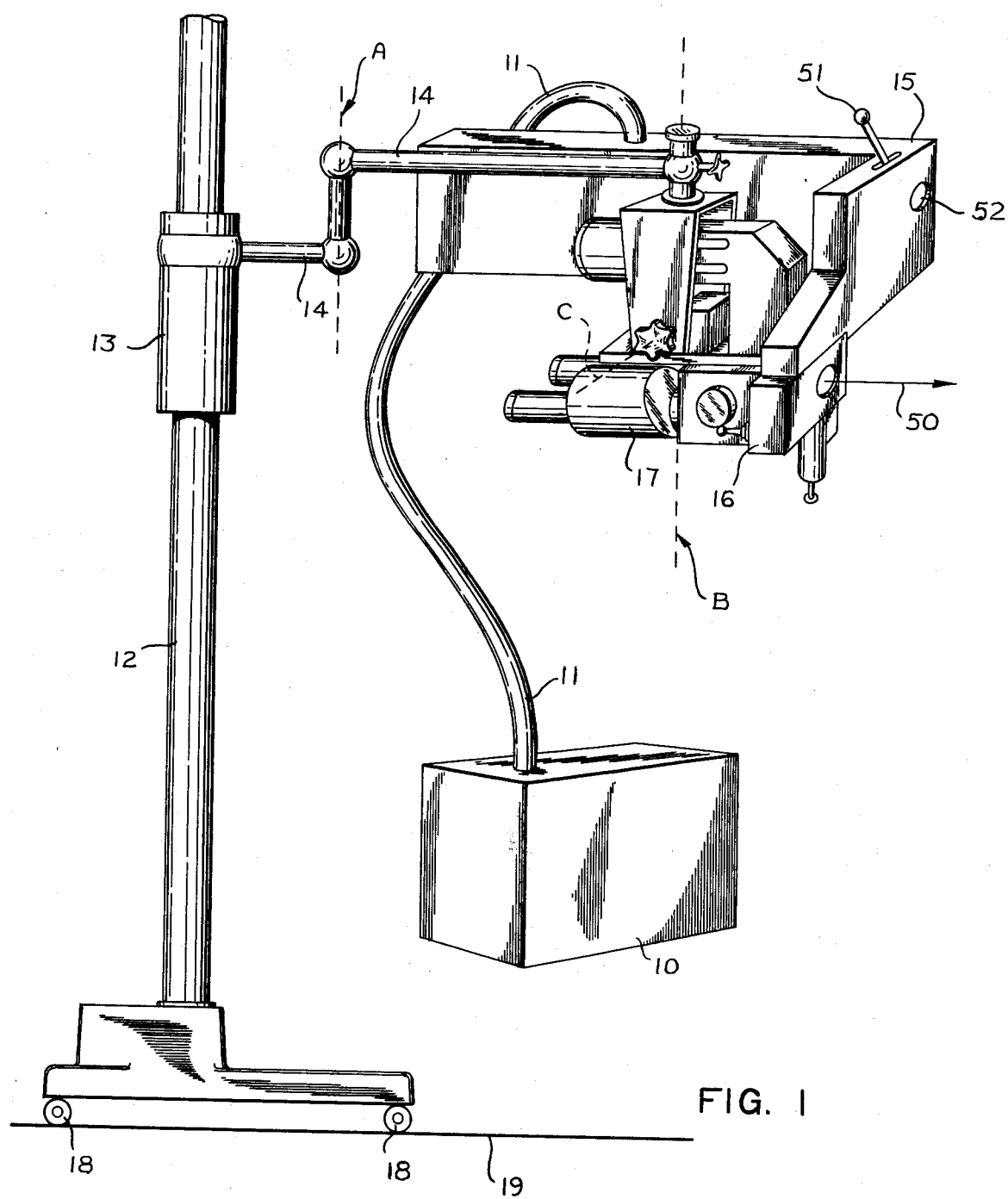
FIG. 1 is an elevational view of an illustrative embodiment of the present invention.

Referring to FIG. 1, the surgical laser system comprises upright support 12 which is movable over substantially horizontal surface 19 on wheels or casters 18. Sleeve 13 moves vertically on upright support 12 and is positioned by operator manual adjustment to whatever vertical displacement from horizontal 19 is desired. Sleeve 13 and the weight supported thereby are counterbalanced by weights (not shown) which are contained within the hollow cylindrical portion of upright support 12.

Mechanical arm 14 is rotatable about the axis of upright support 12 and is extendable by rotation about axis A. At the distal end of arm 14, the following structure is supported: surgical microscope 17, stereo laser endoscope 16, and infra-red laser 15. (In the preferred embodiment, infra-red laser 15 is a $CO_2$ laser, one of a family of infra-red-wavelength lasers.) This optical structure is pivotable about axis B as well as axis C (perpendicular to axis B).

Laser support means 10 comprises all peripheral equipment necessary to operate laser 15. For example, laser support means 10 provides electrical power, and includes a vacuum pump which maintains constant flow of gases such as $CO_2$, $N_2$, and He which are ordinarily used in a $CO_2$ laser device. The vacuum pump is also used to maintain the mixture of gases within a range of desirable pressures. Also included within laser support means 10 are a heat exchanger, and a coolant pump as well as other electrical and mechanical apparatus which may be needed. Cable 11 contains all necessary electrical conductor wires and fluid-conducting tubes which interconnect laser 15 with support means 10 in order to make laser 15 operable. In an alternative embodiment, support means 10 is mounted on the horizontally movable base of upright support 12.

Upright support 12, sleeve 13, arm 14, and surgical microscope 17, are components which, in combination with the stereo laser endoscope of U.S. Pat. No. 3,796,220, and with a $CO_2$ laser of novel construction, comprise the present invention. The laser is mounted fixedly with respect to the optics of the system, and the laser has the capability of remaining completely operative although its angular orientation and thus its direction of loading is changed as the system is employed by a surgeon operating on a patient. Since mirror alignment in a laser is critical to its operation, prior art gas lasers were generally intended for immobile use thereby ensuring minimal misalignment of the mirrors.

The detailed functional and operational interconnections of a laser, a stereo laser endoscope, and a surgical microscope such as those functionally employed in the present invention, are described in the incorporated-by-reference patent; therein, detailed description of the optics including mirrors, lenses, beam controls, etc. are described. Such detailed description thus need not be repeated here. However, it is to be understood that in the referenced patent, laser 15 of the present invention would be located at a distance remote from the microscope/endoscope optics combination, and that the laser beam would be channeled to this optics combination by an articulated arm, the necessity of which is eliminated by the present invention. Suffice it to say that in FIG. 1 of the instant application, laser beam 50 which exits from laser endoscope 16, impinges on a patient work site (not shown). Through surgical microscope 17, a surgeon or physician can view the patient work site being operated upon, and can control the intensity and point of impingement of laser beam 50.

Control stick 51 is connected to a mirror/shutter device (not shown) located within laser device 15. Manual operation of stick 51 operates the mirror/shutter. Laser beam 50 can be made to exit from the apparatus as shown, or can be made to bypass stereo endoscope 16 and exit directly from aperture 52. The latter path may be used for attachment to an articulated arm of special construction, the output optics of which is connected to special accessories permitting surgeons to use the laser beam endoscopically; eg: in the bronchi, the ear, the rectum, etc.

Referring to FIG. 2, laser device 15 is shown schematically and in greater detail. "Break" 34 in FIG. 2 is necessary to provide a large illustration, while maintaining a sense of proportion, and thereby illustrate the detail of the laser with clarity. Laser 15 is a $CO_2$ laser which can provide power output of 40 watts or more. It is a continuous wave laser and can be continuously energized from laser accessory means 10 if necessary. It is constructed in a manner to enable it to be fully operative although it may be angularly displaced in space as required by the operating physician.

Cylinder 20 provides a rigid support for end walls 22 and 23. Mirrors 24 and 25 are contained respectively within end walls 22 and 23. Cylinder 20, although hollow, is rigid, and permits temperature gradients virtually only in the cylinder's axial direction, and thus not in the radial direction. Therefore, any thermal expansion or contraction will be in the axial direction and mirrors 24 and 25 may be axially displaced (by perhaps a micron or two) if a temperature gradient exists, but the angular displacement of the mirrors will be minimized.

Central support 21 is placed between cylinder support 20 and tubes 31. Central support 21 is located approximately at the mid-point of cylindrical support 20 and at the mid-point of tubes 31. Tubes 31 are comprised of outer tube 29 through which coolant fluid is made to flow, and inner tube 30 through which carbon dioxide gas is made to flow. (The fluid pumps are located in laser support 10). Mirrors 24 and 25 are positioned fixedly with respect to each other and are arranged to permit successive co-linear reflections of light, thereby providing the proper geometry and physical environment for lasing action. The various orifices identified collectively by numeral 32, provide the various inputs and outputs for coolant flow and gas flow, and are contained within cable 11 of FIG. 1 which interconnects laser support means 10 and laser device 15.

Finally, support cradle 28 is constructed in a manner to accept the cylindrical support 20 and to connect it fixedly with regard to surgical microscope 17 and laser endoscope 16. It is depicted in a broken-line illustration since details of the connection between the cradle and the remaining apparatus are not essential to the understanding of the present invention. Central support 21 permits minimum loading on the laser, which maintains axial integrity and permits its full operative use regardless of any angular orientation due to surgical requirements.

In operation, carbon dioxide and other gases are pumped through central tube 30. The gas mixture is energized by applying voltages between electrodes 26, 27, and 33, suitably insulated and constructed as is well known in the art. This energization causes lasing action between suitably chosen mirrors 24 and 25. One of the mirrors is partially reflective and partially transmissive permitting laser beam 50 to be transmitted therethrough and to the remaining optics of the system. Fluid coolant is pumped through outer tube 29 to prevent excessive heating of the laser above room temperature. The fluid coolant, absorbs heat from the gaseous discharge, and controllably dissipates the heat by means of a heat exchanger to the ambient atmosphere. The heat exchanges is located in laser accessory 10 of FIG. 1.

In prior art laser systems, fluid coolants having temperatures lower than ambient were generally used. For example, cold tap water was a commonly used coolant. But, if the water was not cold enough, certain procedures such as using ice, etc. were required. This presented a problem to the operators of the surgical laser instrument apparatus. Also, condensation sometimes formed on the optical elements.

But, the heat exchanger of the present invention dissipates (or exchanges) the heat carried by the coolant of the present invention to the atmosphere. Thus the coldest temperature of the cooling system of the present invention is the temperature of the ambient air and the prior art requirement of water or coolant having temperatures lower than room temperature is now eliminated. The system of the present invention is intended for use primarily in hospital or laboratory environments, where room temperature is usually well controlled. The problems associated with variability of water temperature of the prior art thus are also eliminated by use of the heat exchangers of the present invention.

It is of course understood that the operating physician or surgeon can divert laser beam 50 in whatever orientation the physician desires, and the intensity of the beam can be adjusted. Additionally, all of the control available from movement of the "joy stick" described in the incorporated-by-reference patent is of course understood to be available to the physician.

The invention may be embodied in yet other specific forms without departing from the spirit or essential characteristics thereof. For example, the overall longitudinal and pivotable movement available to microscope 17 permits aiming beam 50 in any desired direction, although constraints upon individual pivotable movements may be imposed by structure of the system itself. However, it is to be understood that the dimensions and clearances of the component parts of FIG. 1 can be altered to increase the range of any of the individual pivotable movements.

Thus, the present embodiments depicted in the specification and in the drawings are to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A surgical laser system comprising in combination a system support, an operation microscope mounted on said support, means for aiming said microscope in any desired direction, a stereo laser endoscope operatively and fixedly connected to said microscope, an infra-red laser device supported by said microscope said device operatively and fixedly connected to said endoscope, and peripheral means for energizing, cooling, and providing gas and fluid flow to said laser device.

2. A system as recited in claim 1 and wherein said system support comprises a horizontally mobile upright member, a sleeve vertically movable on said upright member, said upright member including counterbalance means for maintaining said sleeve at a desired position, and an extendable mechanical arm affixed to said sleeve, the distal end of said arm including means for holding said microscope.

3. A system as recited in claim 1 and wherein said infra-red laser device comprises a $CO_2$ laser.

4. A system as recited in claim 2 and wherein said holding means includes pivotable means for rotating said microscope about two mutually orthogonal axis.

5. A system as recited in claim 1 and wherein said peripheral means is supported by said system support.

6. A system as recited in claim 3 and wherein said peripheral means includes heat exchanger means for maintaining the gas of said $CO_2$ laser at a temperature only slightly above ambient temperature.

7. A system as recited in claim 2 wherein said infra-red laser device comprises a $CO_2$ laser.

8. A system as recited in claim 7 and wherein said holding means includes pivotable means for rotating said microscope about two mutually orthogonal axis.

9. A system as recited in claim 8 and wherein said peripheral means is supported by said system support.

10. A system as recited in claim 9 and wherein said peripheral means includes heat exchanger means for maintaining the gas of said $CO_2$ laser at a temperature only slightly above ambient temperature.

11. A system as recited in claim 1 and wherein said laser device comprises thin-walled tubular support means for permitting temperature gradients virtually only in the axial direction of said tubular support means, two parallel mirrors supported at opposite distal ends of said tubular support means for successively reflecting energy of said device, said tubular support means employing central support structure midway between said distal ends to permit minimum loading variation on said device when said aiming means is operated, said tubular support means thereby maintaining said mirrors in said mutually parallel orientation and maintaining said device operative when said aiming means and said peripheral means are operated.

12. A system as recited in claim 11 and wherein said system support comprises a horizontally mobile upright member, a sleeve vertically movable on said upright member, said upright member including counterbalance means for maintaining said sleeve at a desired position, and an extendable mechanical arm affixed to said sleeve, the distal end of said arm including means for holding said microscope.

13. A system as recited in claim 12 and wherein said infra-red laser device comprises a $CO_2$ laser.

14. A system as recited in claim 13 and wherein said holding means includes pivotable means for rotating said microscope about two mutually orthogonal axis.

15. A system as recited in claim 14 and wherein said peripheral means is supported by said system support.

16. A system as recited in claim 15 and wherein said peripheral means includes heat exchanger means for maintaining the gas of said $CO_2$ laser at a temperature only slightly above ambient temperature.

* * * * *